No. 731,040. PATENTED JUNE 16, 1903.
E. GATES.
DIAMAGNETIC SEPARATION.
APPLICATION FILED MAR. 19, 1900. RENEWED JAN. 13, 1903.
NO MODEL.

Witnesses:
D. W. Edelin.
A. E. Grant.

Inventor:
Elmer Gates,
by Jennie Goldsborough
Attys.

No. 731,040. Patented June 16, 1903.

UNITED STATES PATENT OFFICE.

ELMER GATES, OF CHEVY CHASE, MARYLAND, ASSIGNOR TO THEODORE J. MAYER, OF WASHINGTON, DISTRICT OF COLUMBIA.

DIAMAGNETIC SEPARATION.

SPECIFICATION forming part of Letters Patent No. 731,040, dated June 16, 1903.

Application filed March 19, 1900. Renewed January 13, 1903. Serial No. 138,822. (No model.)

*To all whom it may concern:*

Be it known that I, ELMER GATES, a citizen of the United States, residing at Chevy Chase, in the county of Montgomery, State of Maryland, have invented certain new and useful Improvements in Diamagnetic Separation; and I do hereby declare the following to be a full, clear, and exact description of the invention, such as will enable others skilled in the art to which it appertains to make and use the same.

In an application for Letters Patent of the United States filed by me September 26, 1899, Serial No. 731,762, I have described and claimed a method of separating diamagnetic substances from mixtures containing them or for separating diamagnetic substances of different diamagnetic susceptibilities from each other by feeding the mixture into a relatively intense part of a magnetic field and continuing it in the field until the diamagnetic particles to be separated have gradually moved out into a relatively weak part of the field, where they are collected separately as heads.

The purpose of my present invention is to lengthen the period during which the mixture is subjected to the action of the magnetic field. To this end I establish within and about the magnet-poles a body of liquid, which may be stationary, but to which I prefer to give a movement in a direction opposed to that of the material under treatment. In some cases I may substitute for the moving body of liquid a moving body of other fluid—as, for instance, air.

Figure 1:
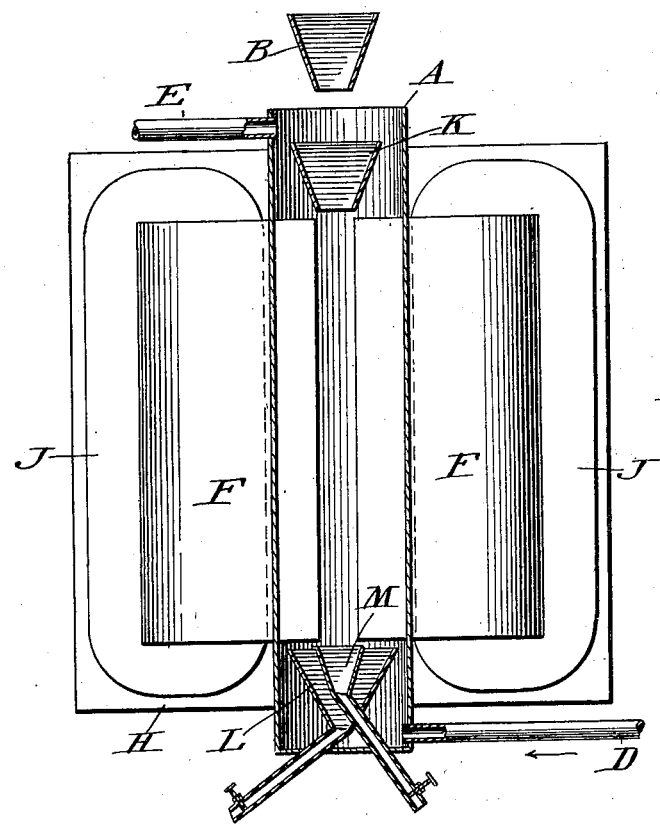
Figure 2:
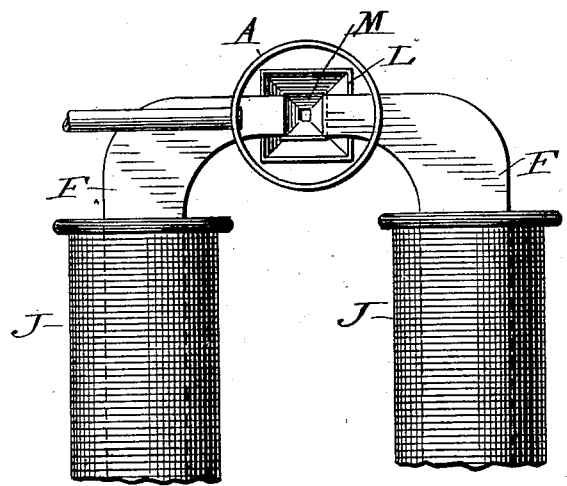

In the accompanying drawings, Figure 1 represents a front elevation, partly in section, of an apparatus adapted for the practice of my invention. Fig. 2 represents a partial top plan view thereof with the upper hoppers removed.

Similar letters of reference indicate similar parts in both views.

Referring to the drawings, H indicates the yoke, F the cores, and J the energizing-bobbins, of an electromagnet, whose pole-pieces are reduced or pointed, as shown, so as to obtain a highly-concentrated field of force, as and for the purposes set forth in my application referred to. At the lower end of the interpolar space I locate a hopper M within a surrounding hopper L, the two hoppers having separate exit-chutes, as shown. At the upper end of the interpolar space I provide a hopper K, from which the material to be separated is dropped into the interpolar space.

For the purpose of establishing in the interpolar space a body of liquid, such as water, I may conveniently inclose the pole ends of the cores within a water-tight casing A, which also incloses the hoppers K, L, and M. Into this receptacle A, I introduce a body of water, so that when the material to be separated is dropped from the hopper B into the hopper K it will be detained during its descent through the interpolar space by the presence of the water therein and will be subjected to a correspondingly-longer period of influence by the magnetic field of force.

Instead of having a stationary or quiescent body of liquid within the receptacle A, I prefer to supply the water to the receptacle continuously through the inlet-pipe D, the overflow being taken by the overflow-pipe E. The upward current thus established within the receptacle A opposes still more the descent of the material to be separated and enables it to be subjected for a correspondingly-longer period of time to the influence of the magnetic field. In some instances I may with good effect substitute for the upwardly-moving column of liquid an upwardly-moving body of some other fluid—as, for instance, air under such pressure as to cause a strong upward flow thereof through the receptacle A.

As explained in my application hereinbefore referred to, as the material falls from the hopper K through the magnetic field of force the particles of greater diamagnetic susceptibility, such as gold or the like, move outward laterally from the falling column into the less intense field on either side and are collected separately from the main body of diamagnetic material of less susceptibility— as, for instance, sand or the like—which falls without substantial deviation through the interpolar space. The extent of deflection or deviation of the separated particles of greater diamagnetic susceptibility is increased correspondingly by the medium through which they fall.

I may say, further, that in practice I may maintain an upward flow of water of sufficient pressure to practically arrest and detain the material in the magnetic field as against its tendency to settle into the hoppers until the fullest opportunity has been afforded for the gold particles to move outwardly into the weaker portion of the field, as contemplated. In such event the material to be treated would preferably be admitted in successive charges, each charge sufficing to occupy the interpolar space and remaining in the field under the detaining effect of the upwardly-established water-current until its accompanying gold had separated out, whereupon the flow can be momentarily stopped or diminished, thereby permitting the separated sand and gold to settle into their respective hoppers, or in view of the greater specific gravity of the gold the gold may be permitted to settle into its receiving-hopper by so graduating the upward flow that it will sustain the sand, while permitting the gold particles to fall through with sufficient slowness to move well outward during their descent into the range of the hopper L. In the latter case after the descent of all the gold particles the upward current could be increased to carry the sand upwardly with the overflow out of the casing A.

Having thus described my invention, what I claim is—

1. The method of separating diamagnetic particles from a mixture containing them, which consists in feeding the mixture into a relatively intense part of a magnetic field, causing said field to be occupied by a body of retarding liquid and thus detaining the material in and subjecting it to the action of the magnetic field until the diamagnetic particles to be separated have moved out from the mixture into a relatively weak part of the field, and then collecting said particles separately as heads; substantially as described.

2. The method of separating diamagnetic particles from a mixture containing them, which consists in feeding the mixture into a relatively intense part of a magnetic field, causing said field to be traversed by a retarding flow of fluid moving in opposition to the movement of the material treated, and thus detaining the material in and subjecting it to the action of the magnetic field until the diamagnetic particles to be separated have gradually moved out from the mixture into a relatively weak part of the field, and then collecting said particles separately as heads, substantially as described.

3. The method of separating diamagnetic particles from a mixture containing them, which consists in feeding the mixture into a relatively intense part of a magnetic field, causing said field to be traversed by a retarding flow of liquid moving in opposition to the movement of the material treated, and thus detaining the material in and subjecting it to the action of the magnetic field until the diamagnetic particles to be separated have gradually moved out from the mixture into a relatively weak part of the field and then collecting said particles separately as heads, substantially as described.

4. The method of separating diamagnetic particles from a mixture containing them, which consists in feeding the mixture into a relatively intense part of a magnetic field in one direction, and causing a current of fluid to flow through said field in the opposite direction to the movement of the mixture, whereby said mixture is detained in the field until the diamagnetic particles have separated out from the mixture and moved into a relatively weak part of said field.

5. The method of separating diamagnetic particles from a mixture containing them, which consists in feeding the mixture into a relatively intense part of a magnetic field, causing said field to be traversed by a retarding flow of liquid moving in opposition to the movement of the material treated, and thus detaining the material in and subjecting it to the action of the magnetic field until the diamagnetic particles to be separated have gradually moved out from the mixture into a relatively weak part of the field collecting said particles as heads, and then increasing the retarding-current to carry off the spent tailings, substantially as described.

6. The method of separating diamagnetic particles from a mixture containing them, which consists in feeding the mixture in successive charges into a relatively intense part of the magnetic field, causing said field to be traversed by an upward current of liquid moving in opposition to the downward feed of the material and thereby arresting the material in said field until the diamagnetic particles have moved out from the mixture into a relatively weak part of the field, permitting said particles to settle as heads, and, after each separation, increasing the upward current to carry off the spent tailings; substantially as described.

In testimony whereof I affix my signature in presence of two witnesses.

ELMER GATES.

Witnesses:
JOHN C. PENNIE,
A. E. GRANT.